United States Patent
Wang

(10) Patent No.: US 6,637,321 B2
(45) Date of Patent: Oct. 28, 2003

(54) BOTTLE CAP FOR VACUUM PRESERVATION

(76) Inventor: Soo chang Wang, Samick apartment 503-1003, 15, Myungil-1dong, Kangdong-ku, Seoul 134-824 (KR)

( * ) Notice: Subject to any disclaimer, the term of this patent is extended or adjusted under 35 U.S.C. 154(b) by 0 days.

(21) Appl. No.: 10/262,134

(22) Filed: Oct. 1, 2002

(65) Prior Publication Data

US 2003/0070563 A1 Apr. 17, 2003

(30) Foreign Application Priority Data

Oct. 8, 2001 (KR) .................................... 2001-0061971

(51) Int. Cl.⁷ .......................... A23L 1/00; B65B 31/04; B65B 31/06
(52) U.S. Cl. .......................... 99/472; 99/467; 215/228; 215/262; 220/203.07; 220/231
(58) Field of Search .......................... 99/467–472, 476, 99/646 C; 206/524.8; 141/65, 96, 198; 417/313, 411; 215/260, 262, 307, 311, 315, 228, 270; 220/231, 212, 203.04, 203.07, 203.23, 240

(56) References Cited

U.S. PATENT DOCUMENTS

| 10,396 A | * | 1/1854 | Nicholson et al. ......... 99/472 X |
| 2,529,964 A | * | 11/1950 | Raab ...................... 215/262 X |
| 3,035,730 A | * | 5/1962 | Walker et al. .......... 215/228 X |
| 3,159,298 A | * | 12/1964 | Saw ...................... 215/262 X |
| 3,557,986 A | * | 1/1971 | Poole, Jr. ............... 215/260 X |
| 4,745,730 A | * | 5/1988 | Bartle, Sr. .............. 141/65 X |
| 5,347,918 A | * | 9/1994 | Chen .......................... 99/472 |
| 5,465,857 A | * | 11/1995 | Yang ..................... 99/472 X |
| 5,535,900 A | * | 7/1996 | Huang .................... 99/472 X |
| 5,971,180 A | * | 10/1999 | Wu .......................... 215/228 |
| 5,974,686 A | | 11/1999 | Nomura et al. |
| 5,992,666 A | * | 11/1999 | Wu ....................... 220/231 X |
| 6,035,769 A | | 3/2000 | Nomura et al. |
| 6,332,550 B1 | * | 12/2001 | Bennett et al. ......... 220/212 X |
| 6,375,024 B1 | * | 4/2002 | Park ......................... 215/262 |

* cited by examiner

Primary Examiner—Timothy F. Simone
(74) Attorney, Agent, or Firm—Roth & Goldman, P.A.

(57) ABSTRACT

Disclosed is a bottle cap for vacuum preservation, comprising a cap main body consisting of a cylindrical cap tube inserted in a vessel, and a holder part extended from an end, located at a vessel inlet, of the cap tube; a piston airtightly inserted in the cap main body and axially sliding along the cap main body to release air in the vessel; and a valve member positioned in an end, located in the vessel, of the cap main body. The holder part is bent in such a way that its bent part is parallel to the cap tube, and the valve member opens and closes an air hole for introducing and releasing air in the vessel according to movement of the piston. The bottle cap can avoid disadvantages of deterioration of contents in the vessel, inconvenience of separately storing a pump, and loss of the pump. Furthermore, the vessel is readily vacuumized using the bottle cap.

5 Claims, 3 Drawing Sheets

BOTTLE CAP FOR VACUUM PRESERVATION

BACKGROUND OF THE INVENTION

1. Field of the Invention

The present invention relates, in general, to a bottle cap, combined with an opening of a bottle for opening or closing the opening and, in particular, to a bottle cap for vacuum preservation which can open or close an opening of a bottle or a vessel and easily create a vacuum in the bottle or vessel to preserve contents under vacuum, thereby storing contents in a fresh state for a long period.

2. Description of the Prior Art

As well known to those skilled in the art, a vessel used to store contents comprises a cap for closing an opening of the vessel, and may have various shapes and consist of various materials.

The cap combined with the vessel plays a role in opening or closing the opening of the vessel and preventing contents in the vessel from flowing out. In the case of goods stored in the vessel, once the vessel is opened, the vessel is no longer maintained under desirable vacuum even though the cap is again plugged into or tightened to the opening of the vessel.

For example, when liquid containing a scent is stored in a bottle, the scent is released as soon as the bottle is opened, and the scent is dissipated in air flowing into the bottle even though a bottle cap is again plugged into or tightened to the opening of the bottle. Accordingly, the liquid containing the scent does not remain intact in the bottle after first opening the bottle because the scent is released from the bottle, and the liquid, for example, wine, is deteriorated in terms of taste and scent, and drugs are oxidized because of air introduced into the bottle.

Much effort has been made to avoid the above disadvantages. For example, reference may be made to the device which has been made by the inventor of the present invention, Korean Utility Model Registration No. 20-0221637, which discloses a bottle cap comprising an air control valve for introducing air into a bottle by pressure or for releasing air in the bottle using a vacuum pump, a cylindrical cap part plugged in a bottle inlet, and a guide protruded from a plate on which the valve is mounted.

In other words, the bottle cap comprises a cap main body having the cap part plugged in the bottle inlet and the air control valve for introducing or releasing air.

The air control valve for introducing or releasing air comprises a hemispherical cover having a penetration hole for introducing or releasing air, a press button penetrating through the cover and having a protruded press rod positioned at the center thereof, a sealing tube airtightly combining the cover with the cap main body and having an air hole for introducing or releasing air, and a shielding plate for opening or closing the air hole in accordance with an operation of the press button.

A button receiving part for receiving the press button is positioned at the center of the hemispherical cover, a rod penetration hole through which the press rod of the press button penetrates is positioned on a bottom of the button receiving part, and a breathing hole for passing air therethrough is positioned around the rod penetration hole.

The shielding plate consists of an elastic material such as rubber, and a pocket-shaped insertion part having a press rod insertion hole in which the press rod of the press button is inserted is positioned at the center of the shielding plate.

The sealing tube consisting of a soft silicone comprises a first part with an expanded diameter covering the button receiving part in the hemispherical cover, a second part with a contracted diameter extended to the cap main body, and a partition positioned between the first part with the expanded diameter and the second part with the contracted diameter. The partition has a penetration hole through which the insertion part penetrates, with a plurality of air holes for introducing or releasing air formed in the partition.

The cap main body having the air control valve for introducing or releasing air comprises a receiving part, positioned at the center thereof to receive the air control valve, and a ring-shaped guide, positioned in the receiving part and protruded from the plate so as to be in contact with an outer and an inner wall of the second part of the sealing tube.

Hereinafter, a description will be given of a procedure of storing contents in the bottle under vacuum using the bottle cap, below.

In the first place, the bottle cap is pressed in such a way that the cap part of the bottle cap is plugged into a bottle inlet, and the vacuum pump is positioned in a press button region of the air control valve. Air in the bottle is then sucked by the pump to separate the shielding plate from the partition of the sealing tube to open the air hole of the tube, and released through the air hole, thereby creating a vacuum in the bottle.

When it is desired to draw the contents from the bottle, the press button of the air control valve is pressed to introduce air into the bottle in a reverse procedure of vacuumizing the bottle. At this time, the bottle cap is readily separated from the bottle by just pulling the bottle cap.

This patent is advantageous in that the air control valve for introducing or releasing air is formed in the bottle cap, thus freshly storing contents in the bottle under vacuum for a long period.

However, this conventional bottle cap is disadvantageous in that the bottle is pumped using a separate pump for creating a vacuum in the bottle, and the pump is not integrated with the vessel.

Meanwhile, a vessel provided with an air control valve for introducing or releasing air has been suggested, but it is inconvenient to use a separate pump like the conventional bottle cap.

SUMMARY OF THE INVENTION

Therefore, the present invention has been made keeping in mind the above disadvantages occurring in the prior art, and an object of the present invention is to provide a bottle cap for vacuum preservation, which can create a vacuum in a vessel without using a separate pump.

Based on the present invention, the object can be accomplished by a provision of a bottle cap for vacuum preservation, comprising a cap main body consisting of a cylindrical cap tube inserted in a vessel, and a holder part extended from an end, located at a vessel inlet, of the cap tube; a piston airtightly inserted in the cap main body and axially sliding along the cap main body to release air in the vessel; and a valve member positioned in an end, located in the vessel, of the cap main body. The holder part is bent in such a way that its bent part is parallel to the cap tube, and the valve member opens and closes an air hole for introducing and releasing air in the vessel according to movement of the piston.

The bottle cap preferably comprises a cylindrical combination part downwardly extended from a holder part; and an outer casing covering the cap tube while being combined with the cylindrical combination part. The outer casing is provided with a penetration hole for introducing or releasing air at a region adjacent the holder part.

The holder part is threaded on an inner wall thereof, thus being readily screwed on a threaded bottle.

The holder part may consist of soft silicone, thereby being easily combined with a bottle mouth.

The valve member preferably comprises a valve cap having an air hole for introducing or releasing air, and a valve body, mounted on the valve cap to open or close the air hole for introducing or releasing air according to movement of the piston. The valve cap is combined with an end, located in the bottle, of the cap tube in such a way that the valve cap closes the cap tube.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
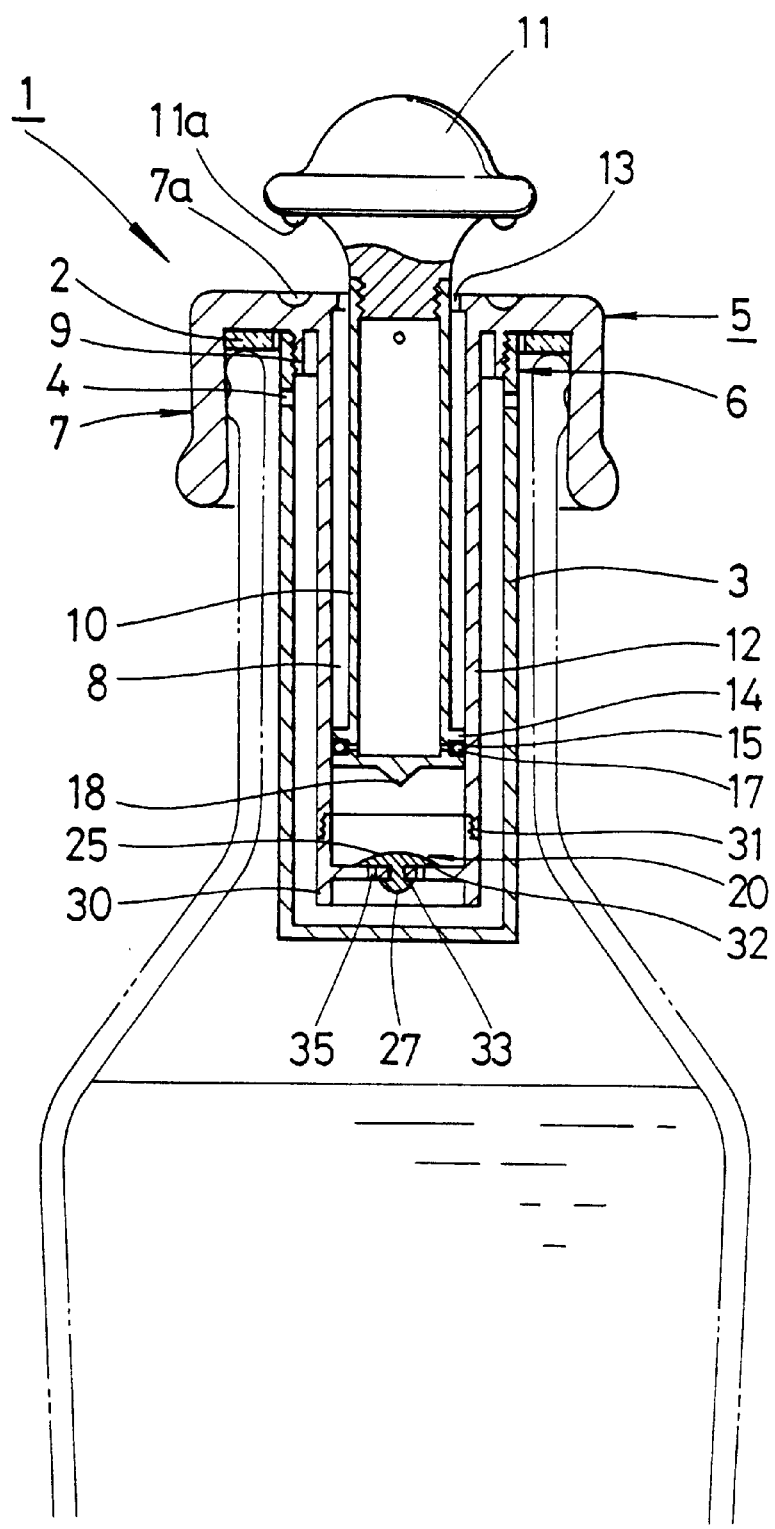
FIG. 1 is a sectional view of a bottle cap according to a first embodiment of the present invention, in which the bottle cap is plugged in a bottle.

Reference should now be made to the drawings, in which the same reference numerals are used throughout the different drawings to designate the same or similar components.

A bottle cap of the present invention comprises a pump and an air control valve for creating a vacuum in a bottle, integrated with the pump, and so a separate pump is not needed.

According to the present invention, the bottle cap comprises a long cylindrical cap main body 5 inserted through a mouth into the bottle, a cylindrical outer casing 3 covering the cap main body 5, a piston 10, airtightly inserted in the cap main body 5 and axially sliding along the cap main body 5, and a valve member 20 positioned at an end, located in the bottle, of the cap main body 5, as shown in FIG. 1.

The cap main body 5 comprises a cylindrical cap tube 6 inserted in the bottle, and a holder part 7 extended from an upper end, located at a bottle mouth, of the cap tube 6. At this time, the holder part 7 is bent in such a way that a side bent part is parallel to the cap tube 6 to form a shape of ']'.

A sliding bore 8 in which the piston 10 is slidingly moved in the cap main body 5 is positioned in the cap tube 6, and an end, located in the bottle, of the cap tube 6 is externally threaded to be engaged with a valve member 20 through a screw-type engagement.

The holder part 7 has a curved form to allow a user to readily grasp it, and a free end of the holder part 7 outwardly protruding prevents the holder part 7 from slipping out of a user's grip. In addition, a packing 2 is positioned under a top wall of the holder part 7.

The holder part 7 may consist of a soft silicone. At this time, the separate packing 2 is not needed. An externally threaded combination part 9, downwardly extended from the holder part 7 to be parallel to the free end of the holder part 7, is positioned at a junction area between the holder part 7 and the cap tube 6.

Figure 3:
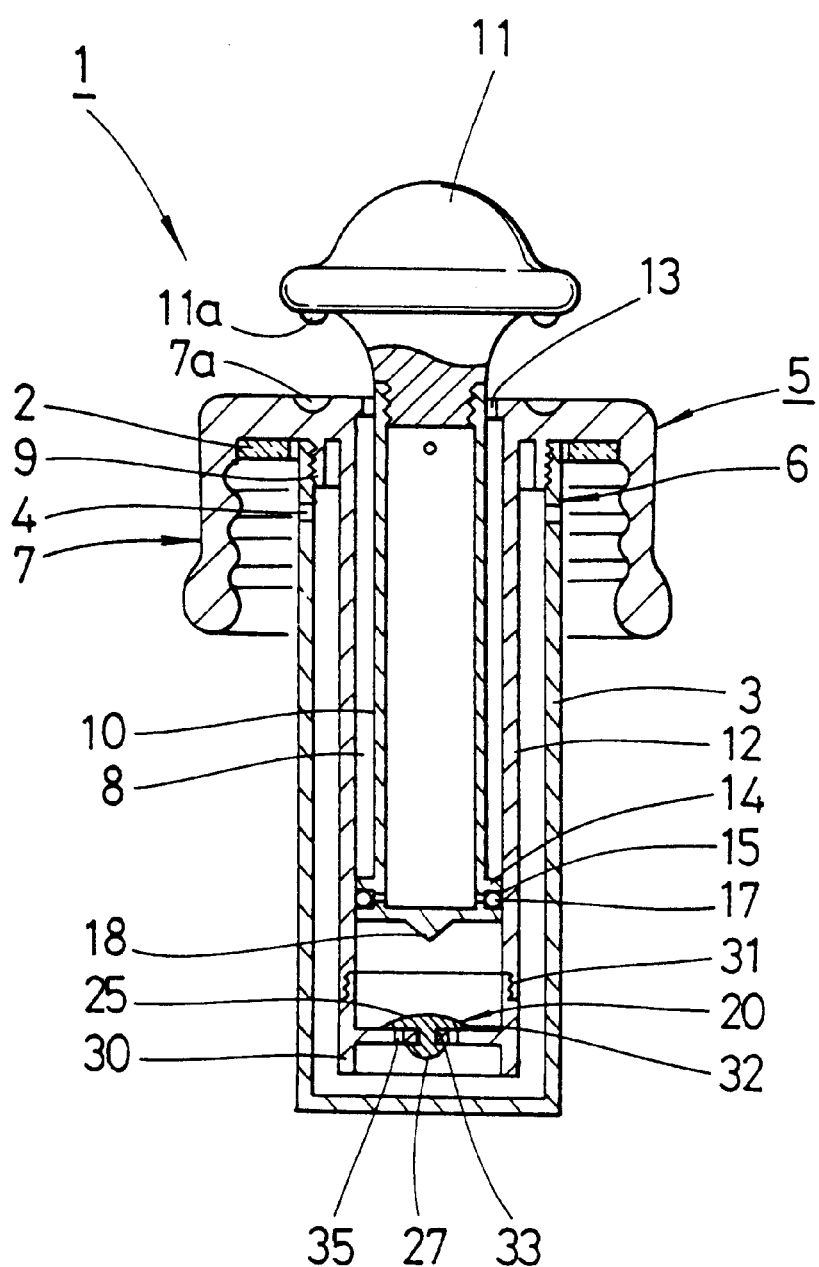
FIG. 3 is a sectional view of a bottle cap according to a third embodiment of the present invention.

If the bottle has an externally-threaded mouth over which the holder part 7 of the bottle cap 1 is fitted, the holder part 7 may be internally threaded as in FIG. 3.

The outer casing 3 covering the cap main body 5 is internally threaded so as to be screwed with the externally threaded combination part 9, and a penetration hole 4 for introducing or releasing air is positioned in a portion of the outer casing 3 adjacent to the combination part 9. At this time, the penetration hole 4 is adjacent to the combination part 9, thus preventing contents in the bottle from flowing out through the hole 4 even though the contents reach a high level in the bottle.

Meanwhile, the piston 10 comprises a handle 11 which is grasped by a user during pumping of the piston 10 and a piston tube 12 downwardly extended from the handle 11. Furthermore, a breathing hole 13 for introducing or releasing air in the sliding bore 8 during pumping of the piston 10 is formed on the cap main body 5 at a position adjacent to the handle 11 of the piston 10. In addition, two annular flanges 14 are formed around an end of the piston tube 12 opposite to the handle 11 while being axially spaced apart from each other at a predetermined interval, and an annular groove 15 is formed between the two flanges 14. At this time, an O-ring 17 is inserted along the groove 15.

A plurality of vacuum releasing projections 11a are formed on a surface, facing the holder part 7, of the handle 11 of the piston 10 at predetermined intervals, and slots 7a for receiving the vacuum releasing projections 11a are positioned on a surface, facing the handle 11, of the holder part 7. Furthermore, a press part 18 for pressing a valve body 25 of the valve member 20 to open the hole 35 is positioned at a free end of the piston 10.

The press part 18 presses the valve body 25 to open the hole 35 when the piston 10 is pressed down until the vacuum releasing projections 11a are seated in the grooves 7a. In such a case, the bottle cap releases the vacuum. Accordingly, when the piston 10 is slidingly reciprocated to create a vacuum in the bottle, the piston 10 should be pumped so that the vacuum releasing projections 11a are not inserted into the grooves 7a.

The piston 10 is inserted in the sliding bore 8 of the cap main body 5, and the annular flanges 14 are in contact with an inner surface of the sliding bore 8. At this time, the piston 10 is airtightly in contact with the cap tube 6 by the O-ring 17 seated along the groove 15 between the flanges 14.

The valve member 20 for opening or closing the hole 35 by movement of the piston 10 comprises a valve cap 30 having the hole 35, and a valve body 25, mounted on the valve cap 30 to open and close the hole 35 for introducing or releasing air. At this rime, the valve cap 30 is combined with an end, positioned in the bottle, of the cap tube 6 in such a way that the valve cap 30 closes the cap tube 6.

The valve cap 30 comprises a cylindrical combination part 31 in which internal threads are formed corresponding to external threads of the cap tube 6, and a shielding part 32 closing the interior of the combination part 31 and having a hole 33 for receiving the valve body 25, in addition to the holes 35. The hole 33 for receiving the valve body 25 is positioned at the center of the shielding part 32, and the holes 35 for introducing or releasing air are positioned at regular intervals around the hole 33.

Additionally, the valve body 25 comprises a main plate 26 for opening or closing the holes 35 for introducing or releasing air, and a combination hook 27, protruded from the center of the plate 26 and combined with the hole 33 for locking the valve body 25 to the hole 33.

A procedure of assembling the bottle cap 1 and creating a vacuum in the bottle using the bottle cap 1 will be described, below.

The valve member 20 is combined with an end of the cap tube 6, the outer casing 3 is combined with the cap tube 6 in such a way that the outer casing 3 covers the cap tube 6 using the combination part 9, and the cap main body 5 is pressed so that the cap tube 6 is inserted through the mouth in the bottle. The piston 10 is then inserted in the sliding bore 8 of the cap tube 6 and pumped.

When the piston 10 is pressed, air in the cap tube 6 is released through the breathing hole 13. On the other hand, when the piston 10 is outwardly pulled, the plate 26 of a valve body 25 is separated from the holes 35, air in the bottle flows through the penetration hole 4 into the outer casing 3, and the air in the outer casing 3 is released through the holes 35 to the atmosphere. When the piston 10 is again pressed on the cap tube 6, the plate 26 of the valve body 25 closes the holes 35 owing to pressure by the piston 10. At this time, air in the cap tube 6 is released through the breathing hole 13 of the piston 10.

As described above, the piston 10 is slidingly reciprocated in the cap tube 6, thereby releasing air in the bottle to create a vacuum in the bottle. After the bottle is vacuumized, the piston 10 remains inserted in the cap tube 6.

Meanwhile, when it is desired to draw contents from the bottle, the piston 10 is revolved in such a way that the vacuum releasing projections 11a are positioned above the grooves 7a, and then the piston 10 is pressed. In that case, the press part 18 of the piston 10 presses the valve body 25, and the valve body 25 is separated from the holes 35, thus releasing air in the bottle.

Therefore, the bottle cap 1 is advantageous in that the bottle is readily vacuumized, thus preventing contents, for example wine, beverages, or drugs from deteriorating in terms of taste and scent. Another advantage of the present invention is that the pump is integrated with the bottle cap, thereby preventing a loss of the pump as well as resolving an inconvenience of separately storing the pump.

Figure 2:
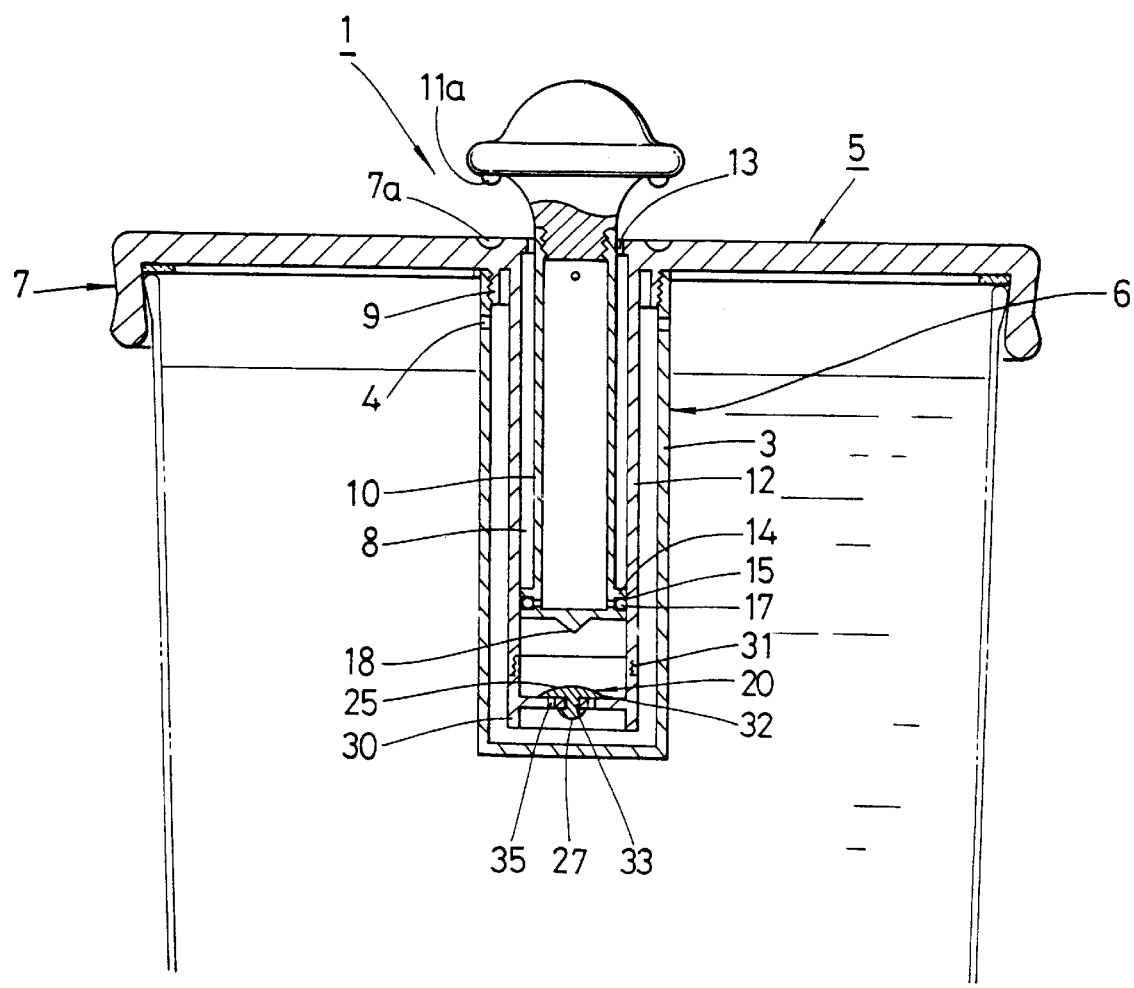
FIG. 2 is a sectional view of a bottle cap according to a second embodiment of the present invention, in which the bottle cap is plugged in a vessel.

In FIGS. 1 and 3, the outer casing 3 constitutes the bottle cap 1. However, when contents in a vessel are not fluid or foods do not entirely fill the vessel, the outer casing 3 may be omitted as shown in FIG. 2.

According to embodiments of the present invention, a description is given of the bottle cap 1 used in the bottle, but the bottle cap 1 can be applied to any type of vessel, thereby creating a vacuum in the vessel without using a separate pump.

As described above, the present invention provides a bottle cap for vacuum preservation, which can prevent contents in a vessel from deteriorating, readily vacuumize the vessel, resolve an inconvenience of separately storing the pump, and prevent a loss of the pump.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A bottle cap for vacuum preservation, comprising:
   a cap main body consisting of a cylindrical cap tube inserted in a vessel, and a holder part extended from an end, located at a vessel inlet, of the cap tube, said holder part being bent in such a way that a bent part of the holder part is parallel to the cap tube;
   a piston airtightly inserted in the cap main body and axially sliding along the cap main body to allow air to flow from the vessel; and
   a valve member positioned in an end, located in the vessel, of the cap main body, said valve member opening or closing an air hole for introducing or releasing air in the vessel according to movement of the piston.

2. The bottle cap according to claim 1, wherein the valve member comprises a valve cap having said air hole for introducing or releasing air, and a valve body, mounted on the valve cap to open or close the air hole for introducing or releasing air according to movement of the piston, said valve cap being combined with an end, located in the vessel, of the cap tube in such a way that the valve cap closes the cap tube.

3. The bottle cap according to claim 2, comprising:
   a cylindrical combination part downwardly extended from the holder part; and
   an outer casing covering the cap tube while being combined with the cylindrical combination part, said outer casing provided with a penetration hole for introducing or releasing air at a region adjacent the holder part.

4. The bottle cap according to any one of claims 1 to 3, wherein the holder part is threaded on an inner wall thereof.

5. The bottle cap according to claim 1, wherein the piston is provided at an end thereof with a press part protruding toward a valve body of the valve member, said press part being moved to or from the valve body, thus operating the valve body to open or close the air hole.

* * * * *